Oct. 26, 1943.   C. G. STRANDLUND   2,332,612
PLOW
Filed Feb. 15, 1941   2 Sheets-Sheet 1

INVENTOR:
CARL G. STRANDLUND
BY
ATTORNEYS.

Oct. 26, 1943.   C. G. STRANDLUND   2,332,612
PLOW
Filed Feb. 15, 1941   2 Sheets-Sheet 2
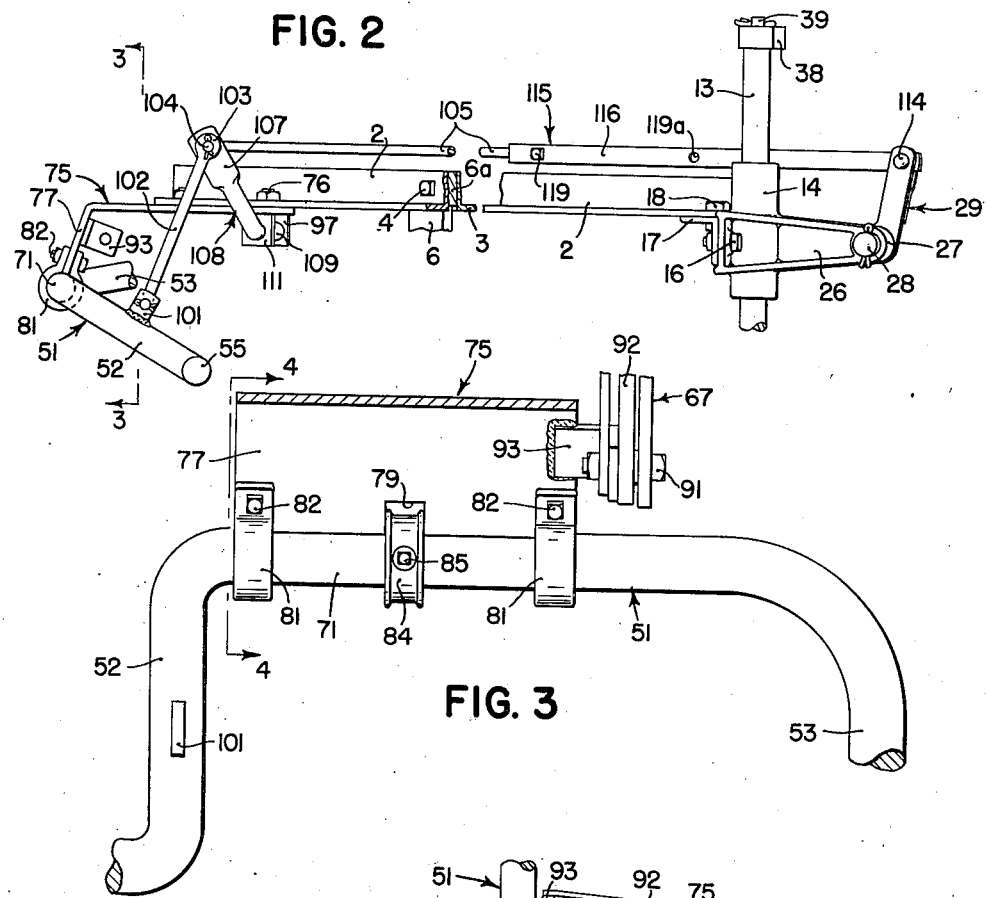
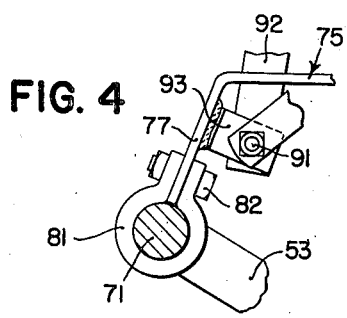
INVENTOR:
CARL G. STRANDLUND
BY
ATTORNEYS.

Patented Oct. 26, 1943

2,332,612

UNITED STATES PATENT OFFICE 2,332,612

PLOW

Carl G. Strandlund, Moline, Ill., assignor to Deere & Company, Moline, Ill., a corporation of Illinois Application February 15, 1941, Serial No. 379,108

14 Claims. (Cl. 97—72)

The present invention relates generally to agricultural implements and more particularly to plows, particularly disk plows of the towed or trailed type commonly hitched to a farm tractor.

The object and general nature of the present invention lies in the provision of an agricultural implement having a one piece rear crank axle with crank sections receiving land and furrow wheels, respectively, which provides a simple but sturdy rear end. In this connection it is a further feature of this invention to provide means whereby depth adjustments are secured principally by generally vertical movement of the rear furrow wheel relative to the adjacent disk or other furrow opener, and it is a further feature of this invention to provide a one piece crank axle for the land and furrow wheels in which the two wheel receiving sections of the one piece crank axle are disposed at such an angle with respect to each other that the desired ratio of vertical movement is obtained. Another feature of this invention, particularly concerned with the provision of a one piece crank axle at the rear, is the arrangement of the one piece crank axle so that the furrow wheel crank axle section is swung into substantially a vertical position when the plow is raised, whereby the raised position of the plow is substantially constant, irrespective of different depth adjustments.

Another important feature of the present invention is the provision of improved connections between the front and rear wheel structures whereby both ends of the plow are raised at the same time but the connecting linkage does not in any way interfere or restrict the clearance at the furrow openers. Specifically, it is a feature of this invention to provide a disk plow having a frame of the overhead type, with the connecting linkage between the front and rear wheel structures disposed even above the overhead frame. Also, in this connection, it is still a further feature of this invention to provide improved hitch connections which are especially formed to provide adequate clearance, especially for the front disk or furrow opener. Specifically, according to the present invention, I provide a cross bar at the front of the frame or beam structure with a depending bracket receiving the front end of a draft bar. The latter is bent at one or more places so that the rear end may be connected to the overhead beam or frame, the bend providing for adequate clearance at the front disk. Moreover, this construction affords a hitch connection that has a certain amount of longitudinal resilience, thereby serving as a cushioned connection, especially since the front end of the hitch bar is slidably disposed in the aforesaid depending bracket.

An additional feature of this invention is the provision of an improved front end construction for disk plows and the like wherein the front furrow wheel and the hitch connection are both adjustable as a unit relative to the front end of the beam or frame, whereby it is a simple matter to adjust the cut of the front disk without in any way disturbing the relation between the hitch and the front furrow wheel. Also, the hitch connection is itself fully and easily adjustable relative to the frame and the front furrow wheel to meet all plowing conditions and to maintain proper line of travel at all times.

These and other objects and advantages of the present invention will be apparent to those skilled in the art after a consideration of the following detailed description taken in conjunction with the accompanying drawings illustrating the preferred embodiment.

In the drawings:

Figure 2 is a fragmentary side view of the plow shown in Figure 1, taken from the furrowed side thereof;

Figure 3 is an enlarged sectional view taken along the line 3—3 of Figure 2, showing the simple sturdy hinged connection between the rear end of the beam or frame structure and the central portion of the one-piece crank axle;

Figure 4 is a section taken along the line 4—4 of Figure 3; and

Figure 5 is a fragmentary plan view of a portion of the rear end of the plow.

Figure 1:
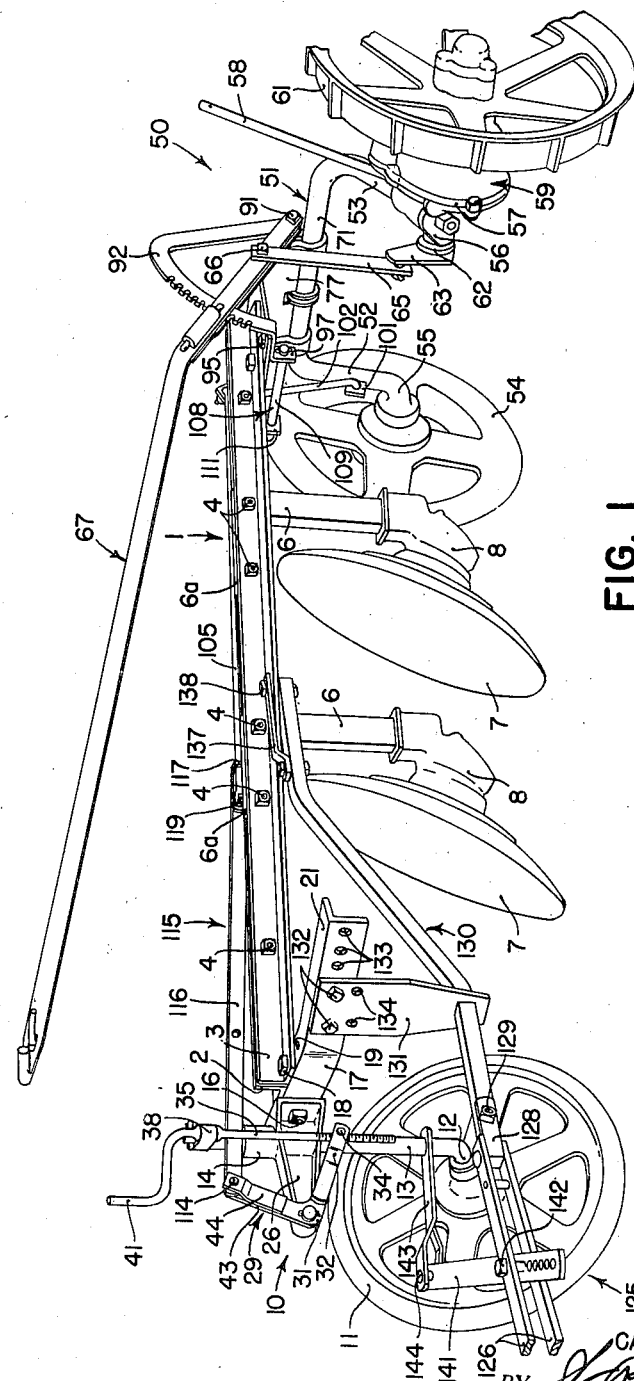
Figure 1 is a land view of a disk plow constructed according to the principles of the present invention, the plow being shown in raised or transport position.

Referring now particularly to Figure 1, the frame or beam construction of the plow is indicated in its entirety by the reference numeral 1 and includes a pair of angle members 2 and 3 fixed together, as by bolts 4, with vertical flanges spaced apart a distance sufficient to receive a pair of disk standards 6 on the lower ends of which disk furrow openers 7 are rotatably mounted by bearing constructions of any suitable design, indicated by the reference numeral 8. Each of the disk standards 6 is of generally L-shaped formation, which provides a forward extension 6a suitably apertured to receive a pair of bolts 4, whereby each standard is rigidly secured to the frame or beam 1.

The front end construction, indicated in its entirety by the reference numeral 10, comprises a front furrow wheel 11 journaled for rotation on the laterally outwardly and downwardly inclined end 12 of a front wheel spindle 13. The latter extends generally upwardly through a sleeve casting 14 fixed in any suitable manner, as by bolts 16 (Figures 1 and 2), to a transverse angle bar 17, the horizontal flange of which is bolted, as at 18, to the front ends of the beam angles 2 and 3. The bar 17 has a plurality of holes 19 so as to permit bolting the bars 2 and 3 to the bar 17 in different lateral positions. An end 21 of the transverse angle bar 17 is bent slightly rearwardly in a generally horizontal plane so as to dispose the end 21 generally transverse to the normal line of advance, the beam structure 1 extending generally diagonally as is common in most disk plows of this type. An arm 26, preferably an integral part of the sleeve casting 14, extends forwardly and has a journal section 27 carrying a stud 28 which serves as a pivot for a bell crank 29. One arm 31 of the latter carries a hammer strap 32, and between the end of the arm 31 and the strap 32 a swivel nut 34 is disposed, the latter receiving the lower threaded end of an adjusting crank 35. The upper end of the latter is fixed against displacement in a vertical direction in an anchoring block 38 mounted on a vertical pivot 39 at the upper end of the furrow wheel spindle 13. The upper end of the adjusting screw 35 is formed with a crank handle 41, and turning the latter adjusts the position of the front furrow wheel spindle 13 relative to the bell crank 29. The latter includes an upwardly extending arm 43, also provided with a hammer strap 44, and this arm is connected to the rear crank axle of the plow by link means which will be described below.

The rear end construction of the plow is indicated in its entirety by the reference numeral 50 and includes a one-piece rear crank axle 51 preferably formed by bending a bar of round stock into the desired shape. The rear crank axle 51 includes two crank axles 52 and 53 which are disposed in planes lying at an angle to one another, and the crank section 52 has an end 55 bent laterally outwardly to receive a rear furrow wheel 54. The other crank section 53 has its lower and forward end squared so as to be rigidly anchored in a sleeve section 56 of a clutch housing 57. Disposed within the latter is suitable half-revolution clutch mechanism 59, the details of which do not per se form any part of the present invention. Such clutch mechanism includes driving and driven parts, the driving part extending laterally outwardly of the clutch housing 57 and carries means by which a rear land wheel 61 is secured thereto. The driven part of the clutch includes a laterally inwardly extending shaft section 62 to which a crank 63 is fixed. A link 65 extends generally vertically upwardly and at its upper end is pivoted, as at 66, to a depth adjusting lever 67.

The intermediate portion of the crank axle 51 is indicated by the reference numeral 71 and is connected with the rear end of the frame or beam 1 for rocking motion relative thereto about a fixed axis. To this end, a plate member 75 is bolted, as at 76, to the rear ends of the beam angles 2 and 3. Preferably, the plate member 75 is pivoted on one of the bolts while the other bolts are received in slots 78 arcuate about the first-mentioned bolt as a center, whereby by loosening the bolts 76, the horizontal angle between the plate member 75 and the beam angles 2 and 3 may be adjusted for hard, soft, and medium soil conditions. The rear portion of the plate member 75 is bent downwardly at an angle, as indicated at 77, and centrally the section 77 of the plate member 75 is provided with a notch 79. The edge of the downwardly bent section 77 rests directly on the intermediate portion 71 of the crank axle 51 and is held in position thereon by a pair of generally U-shaped straps 81 which are bolted, as at 82, to the downturned section 77 of the plate member 75. A collar 84 is adjustably fixed, as by a set screw 85, to the crank axle 51 and serves to prevent the crank axle intermediate section 71 from shifting laterally relative to the plate member 75. However, the lateral position of these parts may be adjusted by loosening the set screw 85 and shifting the crank axle relative to the collar 84. This is primarily a factory adjustment for lining up the associated rods and links and bringing the rear wheels into the proper relation with respect to the disks. However, it does afford very convenient adjustment which can be made at any time it is necessary to reposition these parts.

The adjusting lever 67 is pivoted on a bolt 91 which secures the rear end of a sector 92 to a clip 93 which is welded (Figures 3 and 4) to the plate 75. The forward end 94 of the sector is bent laterally inwardly and is secured by a bolt 95 (Figure 1) to the forward left-hand corner of the plate member 75. The end 94 is also bent downwardly, as at 97, and is apertured to support one end of a rocking member which will be described below.

Mention above was made to the fact that the front and rear wheel constructions are connected together so that the front and rear ends of the plow frame are raised and lowered simultaneously. To this end, a lug 101 is fixed to the crank section 52 and is apertured to receive the lower end of a generally vertically extending link 102. The upper end of the latter is provided with an eye 103 which receives the laterally directed end 104 of a horizontal link 105 which is disposed generally above the frame angles 2 and 3. The laterally directed end 104 also extends through the flattened upwardly and rearwardly extending end 107 of a rocking member 108. The latter includes a horizontal section 109 which is mounted for rocking movement in a lug 111 secured, as by one of the bolts 76, to the rear end of the frame angle 2. The other end of the horizontal portion 109 of the rocking member 108 is received in the apertured lug 97 formed on the sector 92 as described above. The link 105 forms a part of link means indicated generally by the reference numeral 115 which connects the rocking member 108 with the bell crank 29. The link means 115 includes, not only the link 105 mentioned above, but also a strap member 116. The front end of the latter is pivoted at 114 to the upper arm 43 of the bell crank, and the rear end of the strap link 116 is bent laterally, as at 117, and apertured to receive the forward end of the link 105. This forward end is formed with an eye to receive a bolt 119 which extends through an opening in the rear end of the strap 116, whereby the two members 105 and 116 are connected together to transmit pulling stresses. By virtue of this construction, whenever the rear crank axle is rocked, either by the depth adjusting lever 67 or by the operation of the lifting clutch 59, a corresponding rocking motion of the bell crank 29 occurs, which raises or lowers the frame relative to the front wheel 11. It will be noted, particularly from Figure 2, that when raising the frame, the rear axle 51 swings in a clockwise direction, which exerts a pull on the vertically extending link 102. Since the rocking member 108 extends generally upwardly and rearwardly, this member serves as a motion transmitting means whereby the generally downward movement of the link 102 causes a generally rearward movement of the horizontal link means 115, and this movement swings the bell crank 29 in a counterclockwise direction (Figure 2), thus raising the front end of the plow by an amount corresponding to the amount the rear end is raised by the aforesaid clockwise rocking of the rear crank axle 51. By virtue of the use of the rocking member 108 and its position as described above, the horizontal link means 115 is disposed well out of the way of the disks and even above the overhead frame angles 2 and 3. Thus, the interconnecting linkage between the front and rear wheel structures does not in any way reduce the clearance of the furrow openers, yet all raising stresses are transmitted in tension which, as will be obvious, requires only rods and links of relatively small diameter, as compared with the size of these parts if they were called upon to transmit a pushing force.

In Figures 1 and 2 I have shown a two disk plow, but under some conditions, such as where a tractor of only limited capacity is available, it may be desirable to reduce the plow to one disk. In this case, the rear disk 7 and associated standard is removed from the plow frame, and then the rear end construction 50 moved laterally forward along the beam angles 2 and 3 to a position where the land and furrow wheels are adjacent the forward disk 7. To this end, the horizontal flanges of the beam angles 2 and 3 are provided with properly located holes to receive the attaching bolts 76 in the new position of the rear end structure 50. When this readjustment is made, reducing the plow to a one disk plow, the eye bolt 119 is removed from its position shown in Figure 2 and shifted forwardly and inserted in an opening 119a adjacent the front end of the strap member 116. The rear end of the latter then slides backwardly on the link 105. By this means, the effective length of the link means 115 is reduced to correspond to the forward displacement of the rear end structure 50.

Draft is applied to propel the plow through a bent member which, by virtue of the bent portion thereof, serves to cushion the application of power to the plow. The hitch, which is indicated in its entirety by the reference numeral 125, comprises upper and lower drawbars 126 which are pivotally connected with a tractor or any other suitable source of draft, and the rear ends of the drawbars 126 are pivotally connected to a clevis 128 pivoted, at 129, to the front end of a bent cushion draft bar 130. The forward end of the latter is mounted for sliding movement in the lower end of a hitch plate 131 that is disposed generally vertically and is bolted, as at 132, to the vertical flange of the transverse angle bar section 21. The latter is provided with a plurality of holes 133 to receive the bolts 132, and similarly, the hitch plate 131 is provided with a plurality of bolt holes 134. By virtue of the latter, the hitch plate 131 may be secured to the transverse bar section 21 in vertically adjusted position, while the plurality of holes 134 provide for attaching the hitch plate 131 to the transverse bar section 21 in a plurality of laterally adjusted positions. It will be noted, however, that by leaving the hitch plate 131 bolted in place to the transverse angle bar section 21, the front end of the hitch bar 130 may be adjusted with the front wheel structure 10 relative to the front ends of the frame angles 2 and 3, since the bolts 18 connecting the front ends of the frame angles 2 and 3 to the horizontal flange of the transverse angle bar 17 may be disposed in different holes in the horizontal flange thereof to adjust the width of cut of the front disk. The cushion draft bar 130 is bent upwardly and rearwardly behind the hitch plate 131 and at its upper end carries a hammer strap 137. The rear end of the hammer strap and the rear end of the draft bar 130 are apertured to receive a bolt 138 by which the forward draft is applied directly to the plow frame or beam structure 1. Since the bar 130 is bent, it will be seen that the transmission of the draft forces from the tractor or other source of power to the plow is cushioned by the fact that the bent bar 130 may extend slightly under heavy loads. A steering link 141 is pivoted, as at 142, to the drawbars 126 and has its outer end pivoted, as at 144, to the forward end of a steering arm 143 fixed to the lower end of the furrow wheel spindle 13.

The operation of the plow described above is substantially as follows:

The plow is shown in Figure 1 in its transport position. When it is desired to place the same in operation, the trip lever 58 is released and this permits the crank sections 52 and 53 to rock forwardly. Due to the fact that when in the raised position of the plow the furrow wheel crank section 52 is almost vertical, variations from the vertical position due to different depth adjusting positions of the hand lever 67 will have only a small effect on the position to which the plow will be raised when the clutch 59 is actuated and the crank 63 swung upwardly into a position raising the rear end of the plow. This provides what is substantially a constant lift construction. The angle between the two sections 52 and 53 of the crank axle 51 and their respective lengths are such that when in operating position at about average plowing depth, the intermediate portion 71 of the rear crank axle 51 is substantially in a horizontal plane. Variations from the horizontal position are relatively small over the entire range of adjustment effected by the depth adjusting lever 67. The rocking movement of the crank axle 51 when the clutch 59 is operated acts through the link means 115 and associated parts to raise and lower the front end of the plow frame. During the rocking movement of the crank axle 51 the angle of the intermediate section 71 changes only slightly.

The transmission of the draft forces through the rather sharply bent draft bar 130 is cushioned to an appreciable extent, and this construction also provides improved clearance for the front disk. In this type of plow the vertical position of the hitch plate 131 is adjusted so that the line of draft from the center of resistance of the disks 7 to the point of application of power to the front ends of the drawbars 126 passes through the swivel connection at the clevis 128. If under certain plowing conditions the swivel 128 does not lie in the line of draft, the frame 1 due to its flexibility can twist slightly to permit the part 128 to move into the line of draft, the frame rocking generally about the point of contact of the front furrow wheel 11 with the bottom of the furrow. This flexibility of the beam or frame structure also permits the hitch bar 130 to yield under excessive load; that is, the yielding of the bar 130 serves to raise or lower slightly the point where the bar 130 passes through the lower end of the hitch plate 131. Thus, the frame 1 yields to permit a readjustment of these points whenever the draft forces increase to a point where the bar 130 tends to straighten. The bar 130 is constructed, of course, so that normal draft forces never become great enough to stress the bar beyond its elastic limit.

Different depths of operation are secured by moving the hand lever 67 in one direction or the other. The pivot 66 is relatively close to the pivot 91 since relatively little movement of the crank axle 51 is required to secure a full range of depth adjustment. This is because when making a depth adjustment the rear furrow wheel 54 is also raised and lowered, due to the fact that the crank axle 51 is an integral part. If, for example, it is desired to increase the depth of plowing, the hand lever 67 is raised, say one or two notches, and this movement swings the two crank sections 52 and 53 forwardly and upwardly. Since the land wheel crank section 53 is angled in advance of the furrow wheel crank section 52, the land wheel is elevated by this movement an amount greater than the furrow wheel 54, the latter being elevated relative to the adjacent disk 7 by only a small amount. However, since it is elevated, even though only a small amount, the disks immediately penetrate to a greater depth until the disks operate deep enough to permit the furrow wheel 54 to roll along the bottom of the furrow. By way of example it may be mentioned that raising the rear furrow wheel 54 by only a half-inch above the disk 7 in plowing position results in an increased penetration of approximately five inches. Likewise, if it should be desired to decrease the depth of penetration, the hand lever 67 is moved downwardly, which rocks the crank sections 52 and 53 backwardly, thereby moving the furrow wheel 54 slightly below the lower edge of the adjacent rear disk 7. Again, the land wheel 61 is lowered an appreciably greated extent than the furrow wheel 54, due to the fact that in any position of the rear wheels, the crank section 52 is more nearly in a vertical position than the crank section 53. It has been found, for example, that lowering the furrow wheel 54 one-half inch below the level of the adjacent disk 7 reduces the depth of penetration by approximately five inches. Since the crank portions of the rear crank axle are disposed at an angle to one another, there is a differential movement between the rear wheels when the crank axle is rocked, particularly during depth adjusting operations, the extent of movement of the land wheel being greater than the corresponding movement of the rear furrow wheel.

The plow may be arranged for different soil conditions by swinging the rear frame plate 75 with respect to the beam angles 2 and 3, as described above, and the width of cut of the front disk may readily be adjusted by shifting the transverse angle 17 relative to the front end of the beam angles 2 and 3, which shifts the front furrow wheel and the hitch connections together. When adjusting for the width of cut of the front disk, the variation between the front furrow wheel and the hitch remains constant, but the position of the hitch is readily adjusted, as to accommodate tractors of different widths, by moving the hitch plate 131 in one direction or the other along the transverse angle bar 17.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. A plow comprising a beam structure, a rear axle, means connecting the rear axle with the rear portion of said beam structure for lateral adjustment relative thereto, an adjusting lever mounted for pivotal movement on the rear end of said beam structure, and a laterally swingable link extending from said lever to said crank axle and accommodating said lateral adjustment of the beam structure relative to the crank axle, movement of said lever acting through said link to swing said crank axle to raise and lower the beam structure relative to said wheels in any lateral position of said crank axle relative to said beam structure.

2. In an agricultural implement comprising means serving as a frame and tool means carried thereby, a plate member fixed to the frame rearwardly of the tool means and having a notch in one edge portion thereof, a rockable shaft member disposed in contact with said edge portion, the weight of said frame and associated parts being imposed on said shaft member through the contact therewith of said edge portion of said plate member, means holding said shaft member in position relative to the edge portion of said plate member and accommodating rocking movement of the shaft member, and a collar disposed about said shaft section and adjustably fixed thereto, said collar being disposed in the notch in said plate member and reacting thereagainst to hold the shaft member against axial displacement relative to said plate member.

3. A rear axle construction for disk plows and the like comprising a one-piece crank axle having wheel receiving crank portion, land and furrow wheels journaled on said crank portions, respectively, said plow including a beam structure, a plate member including a substantially flat portion adapted to be secured to the rear end of said beam structure and a downturned portion to which said crank axle is connected for rocking movement and for lateral adjustment, adjustable means fixing said crank axle against lateral movement relative to the downturned portion of said plate member, a depth adjusting lever pivotally connected with the substantially flat portion of said plate member, and generally downwardly extending link means connecting said lever with said crank axle whereby movement of said lever serves to swing said crank axle, said link means being connected at its ends for limited lateral movement relative to said lever and crank axle, respectively, thereby accommodating lateral adjusting movement of said crank axle relative to said plate member.

4. In a plow comprising an overhead frame having one or more tools connected thereto, a transverse bar fixed at the forward end of said frame, a hitch plate depending from said bar, and a draft bar slidably disposed at its forward end in the lower portion of said hitch plate, said draft bar being bent upwardly at a point rearwardly of said hitch plate and attached at its rear end directly to said overhead frame.

5. A plow as defined in claim 4, said tools comprising a plurality of disks fixed to said frame, said draft bar being further characterized by being bent upwardly at a point forward of the forwardmost disk and disposed substantially entirely above the level of the latter so as to provide clearance in front of said forwardmost disk.

6. A disk plow comprising a generally diagonally disposed beam structure, a cross bar fixed to the forward end of said beam structure for generally lateral adjustment relative thereto, a furrow wheel spindle movably connected with said cross bar at one end thereof, said furrow wheel spindle being adjustable laterally with said cross bar relative to said beam structure whenever said cross bar is adjusted, movable rear support means for the rear portion of said beam structure, means for raising and lowering said beam structure relative to said rear support means, spindle raising and lowering means on said one end of said cross bar and operatively connected to raise and lower said furrow wheel spindle, and link means connecting said bell crank means with said raising and lowering means for the rear support, said link means accommodating lateral adjustment of said cross bar and furrow wheel spindle relative to said beam structure.

7. A disk plow as defined in claim 6, further characterized by said bell crank means including a generally upwardly directed bell crank arm, said link means being connected at its forward end with the upper end of said arm and disposed generally above said beam structure, said support means including a swingable crank axle rockably connected with said beam structure and extending downwardly and forwardly, a motion transmitting member rockably connected with said beam structure and extending generally upwardly, the rear portion of said link means being connected to said motion transmitting member, and a link member extending generally downwardly from said motion transmitting member to said crank axle whereby downward and rearward movement of the latter exerts a pull through said link and said link means to raise the front end of said beam structure relative to said furrow wheel spindle.

8. In a disk plow including a frame, disk tool means carried thereby, a front wheel shiftable relative to said frame, a rear crank axle swingable relative to said frame, means for connecting said rear crank axle and front wheel for movement together, comprising generally horizontal link means connected at its front end with said shiftable front wheel whereby rearward movement of said link means serves to raise the front end of said frame relative to said front wheel, a generally vertically extending link connected at its lower end with said crank axle whereby swinging movement of the latter to raise the rear end of said frame moves said link generally downwardly, and means connected with said link and link means whereby downward movement of said link causes rearward movement of said link means, said link means being disposed generally above said tool means and alongside said frame.

9. In a plow, a frame, a downwardly and forwardly extending crank axle rockably connected with the rear end of said frame, a front wheel movably connected with the front end of said frame, means including a rearwardly extending link disposed above said frame and operatively connected with the latter and said wheel for raising the frame relative thereto, an upwardly and rearwardly extending arm rockably mounted at its lower end on said frame adjacent the rear thereof, said link being connected at its rear end with the upper end of said rockably mounted arm, and a downwardly extending link also connected at its upper end with the upper end of said arm and connected at its lower end with said crank axle whereby downward and rearward swinging movement of the latter rocks said arm and swings said first mentioned link rearwardly.

10. In a plow, a beam structure, an axle structure therefor including an axle section, and means rockably connecting said axle section with said beam structure comprising a plate member having a forward horizontal section fixed to said beam structure and a downwardly and rearwardly bent section adapted to receive said axle section.

11. In a plow, a beam structure, an axle structure therefor including an axle section, means rockably connecting said axle section with said beam structure comprising a plate member having a forward horizontal section provided with slot means therein and a downwardly bent portion at the rear, means passing through said slot means for adjustably fixing the forward part of said plate member to said beam structure, and means rockably connecting said axle section to the downwardly bent portion of said plate member.

12. A disk plow comprising a generally diagonally disposed beam structure, a cross bar fixed to the forward end of said beam structure for generally lateral adjustment relative thereto, a furrow wheel spindle movably connected with said cross bar at one end thereof, a hitch bracket fixed to the other end of said cross bar, hitch means supported by said bracket and connected rearwardly to said beam structure, said hitch bracket and furrow wheel spindle being adjustable laterally with said cross bar relative to said beam structure whenever said cross bar is adjusted, movable rear support means for the rear portion of said beam structure, means for raising and lowering said beam structure relative to said support means, means on said one end of said cross bar and operatively connected to raise and lower said furrow wheel spindle, and link means connecting said spindle raising and lowering means with said raising and lowering means for the rear support, said link means accommodating lateral adjustment of said cross bar and furrow wheel spindle relative to said beam structure.

13. In an agricultural implement, a supporting member, a wheel carrying swingable crank axle rockably connected with one end of said supporting member, shiftable wheel carrying means at the other end of said supporting means, shiftable link means connected at one end with said shiftable wheel carrying means, a motion transmitting member movably connected with said supporting member and receiving the other end of said link means, and a link member extending generally downwardly from said motion transmitting member to said crank axle whereby rocking movement of the latter exerts a pull through said link and said link means to actuate said shiftable wheel carrying means.

14. An agricultural implement comprising means serving as a frame, a plate member fixed thereto and having a generally downwardly facing edge portion, a rockable shaft member disposed in contact with said edge portion, and means holding said shaft member in position against the edge portion of said plate member and said edge contact affording substantial bearing surface for accommodating the rocking movement of the shaft member.

CARL G. STRANDLUND.